United States Patent
Borenstein et al.

(10) Patent No.: US 8,473,340 B2
(45) Date of Patent: Jun. 25, 2013

(54) PRODUCT MARKETING UTILIZING BROWSING HISTORY

(75) Inventors: Howard Borenstein, Toronto (CA); Teresa C. Kan, Rochester, MN (US); Ruthie D. Lyle, Durham, NC (US); Farrokh E. Pourmirzaie, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 301 days.

(21) Appl. No.: 12/825,660

(22) Filed: Jun. 29, 2010

(65) Prior Publication Data

US 2011/0320254 A1 Dec. 29, 2011

(51) Int. Cl.
*G06Q 30/00* (2012.01)
(52) U.S. Cl.
USPC ..................................... 705/14.25
(58) Field of Classification Search
USPC ..................................... 705/14.25
See application file for complete search history.

(56) References Cited

U.S. PATENT DOCUMENTS

| | | | |
|---|---|---|---|
| 6,873,968 B2 * | 3/2005 | Ehrlich et al. | 705/80 |
| 7,028,261 B2 | 4/2006 | Smyth et al. | |
| 2002/0156699 A1 * | 10/2002 | Gray et al. | 705/26 |
| 2006/0004772 A1 | 1/2006 | Hagan et al. | |
| 2008/0250026 A1 | 10/2008 | Linden et al. | |
| 2009/0077495 A1 | 3/2009 | Bhat et al. | |
| 2009/0240686 A1 | 9/2009 | Murali | |

* cited by examiner

*Primary Examiner* — Naresh Vig
(74) *Attorney, Agent, or Firm* — Law Office of Jim Boice

(57) ABSTRACT

A computer implemented method markets a particular product in an e-commerce system. A web page server receives a request for a current web page that displays a particular product. The request is accompanied by an authorization indicium to retrieve a content of a previous web page that offered the particular product at a previous price. A current price for the particular product is dynamically adjusted based on the previous price offered on the previous web page, and is then presented on the current web page.

20 Claims, 5 Drawing Sheets

PRODUCT MARKETING UTILIZING BROWSING HISTORY

BACKGROUND

The present disclosure relates to the field of computers, and specifically to the use of computers in e-commerce. Still more particularly, the present disclosure relates to the use of browsing history with e-commerce.

Computers are used in e-commerce to enable customers in purchasing products or services over the Internet. Enterprises provide information on such products or services on websites on the world wide web. This allows shoppers to examine a product on one or more webpages, where they obtain detailed information about that product, and ultimately can order, pay for, and ship the product to a location of the buyer's choosing. Similarly, a service can be ordered on-line, thus resulting in the service being delivered either on-line or by a personal visit from a service technician.

BRIEF SUMMARY

In one embodiment, a computer implemented method markets a product in an e-commerce system. A web page server receives a request for a current web page that displays a particular product. The request is accompanied by an authorization indicium to retrieve a content of a previous web page that offered the particular product at a previous price. A current price for the particular product is dynamically adjusted based on the previous price offered on the previous web page, which is then presented on the current web page.

In one embodiment, a computer system comprises: a central processing unit; and a computer readable memory coupled to the central processing unit, wherein the computer readable memory comprises software that, when executed, causes the central processing unit to implement: detecting a request, from a specific customer, for a current web page that displays a particular product; retrieving a browsing history of the specific customer, wherein the browsing history reveals a content of a previous web page that offered the particular product to the customer at a previous price; dynamically adjusting a current price for the particular product based on the previous price revealed by the browsing history; and presenting, to the specific customer, the current price for the particular product on the current web page.

In one embodiment, a computer program product comprises a computer readable storage medium having computer readable program code embodied therewith. The computer readable program code comprises: computer readable program code to detect a request, from a specific customer, for a current web page that displays a particular product; computer readable program code to retrieve a browsing history of the specific customer, wherein the browsing history reveals a content of a previous web page that offered the particular product to the customer at a previous price; computer readable program code to dynamically adjust a current price for the particular product based on the previous price revealed by the browsing history; and computer readable program code to present, to the specific customer, the current price for the particular product on the current web page.

DETAILED DESCRIPTION

As will be appreciated by one skilled in the art, the present disclosure may be embodied as a system, method or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Figure 1:
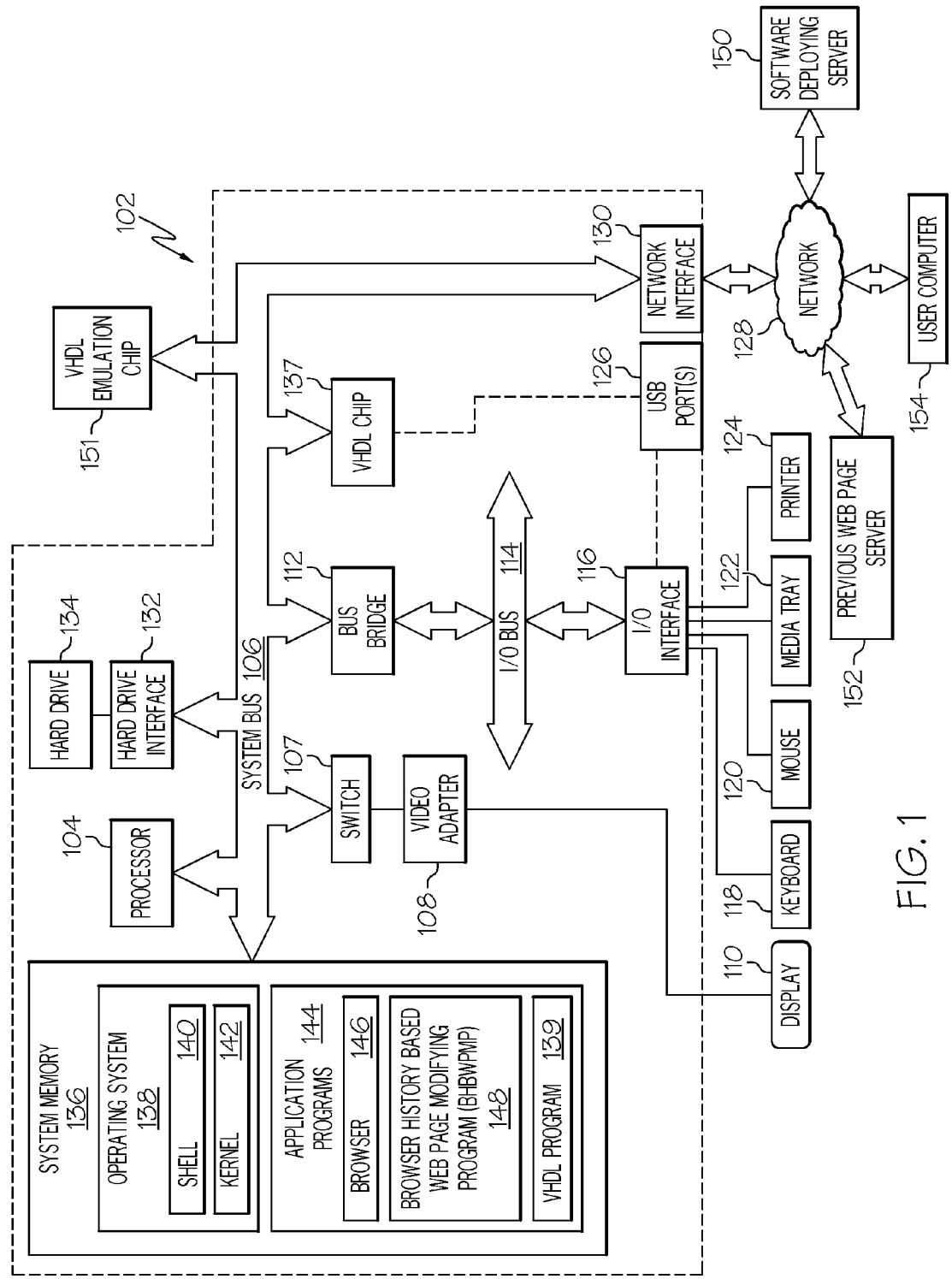
FIG. 1 depicts an exemplary computer in which the present disclosure may be implemented.

With reference now to the figures, and in particular to FIG. 1, there is depicted a block diagram of an exemplary web page server 102, which may be utilized by the present disclosure. Note that some or all of the exemplary architecture, including both depicted hardware and software, shown for and within web page server 102 may be utilized by a software deploying server 150, a previous web page server 152, and/or a user computer 154. In one embodiment, web page server 102 provides a current web page to user computer 154, as described in an exemplary manner herein, while previous web page server 152 provides a previous web page to user computer 154. In one embodiment, web page server 102 and previous web page server 152 are a same computer.

Web page server 102 includes a processor unit 104 that is coupled to a system bus 106. Processor unit 104 may utilize one or more processors, each of which has one or more processor cores. A video adapter 108, which drives/supports a display 110, is also coupled to system bus 106. In one embodiment, a switch 107 couples the video adapter 108 to the system bus 106. Alternatively, the switch 107 may couple the video adapter 108 to the display 110. In either embodiment, the switch 107 is a switch, which may be mechanical, that allows the display 110 to be coupled to the system bus 106, and thus to be functional only upon execution of instructions (e.g., browser history based web page modifying program—BHBWPMP 148 described below) that support the processes described herein.

System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and (if a VHDL chip 137 is not utilized in a manner described below), external USB port(s) 126. While the format of the ports connected to I/O interface 116 may be any known to those skilled in the art of computer architecture, in one embodiment some or all of these ports are universal serial bus (USB) ports.

As depicted, web page server 102 is able to communicate with a software deploying server 150 via network 128 using a network interface 130. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in web page server 102. This volatile memory includes additional higher levels of volatile memory (not shown), including, but not limited to, cache memory, registers and buffers. Data that populates system memory 136 includes web page server 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present disclosure will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., web page server 102) to send and receive network messages to the Internet using hypertext transfer protocol (HTTP) messaging, thus enabling communication with software deploying server 150 and other described computer systems.

Application programs 144 in web page server 102's system memory (as well as software deploying server 150's system memory) also include a browser history based web page modifying program (BHBWPMP) 148. BHBWPMP 148 includes code for implementing the processes described below, including those described in FIGS. 2-5. In one embodiment, web page server 102 is able to download BHBWPMP 148 from software deploying server 150, including in an on-demand basis, such that the code from BHBWPMP 148 is not downloaded until runtime or otherwise immediately needed by web page server 102. Note further that, in one embodiment of the present disclosure, software deploying server 150 performs all of the functions associated with the present disclosure (including execution of BHBWPMP 148), thus freeing web page server 102 from having to use its own internal computing resources to execute BHBWPMP 148.

Also stored in system memory 136 is a VHDL (VHSIC hardware description language) program 139. VHDL is an exemplary design-entry language for field programmable gate arrays (FPGAs), application specific integrated circuits (ASICs), and other similar electronic devices. In one embodiment, execution of instructions from BHBWPMP 148 causes VHDL program 139 to configure VHDL chip 137, which may be an FPGA, ASIC, etc.

In another embodiment of the present disclosure, execution of instructions from BHBWPMP 148 results in a utilization of VHDL program 139 to program a VHDL emulation chip 151. VHDL emulation chip 151 may incorporate a similar architecture as described above for VHDL chip 137. Once BHBWPMP 148 and VHDL program 139 program VHDL emulation chip 151, VHDL emulation chip 151 performs, as hardware, some or all functions described by one or more executions of some or all of the instructions found in BHBWPMP 148. That is, the VHDL emulation chip 151 is a hardware emulation of some or all of the software instructions found in BHBWPMP 148. In one embodiment, VHDL emulation chip 151 is a programmable read only memory (PROM) that, once burned in accordance with instructions from BHBWPMP 148 and VHDL program 139, is permanently transformed into a new circuitry that performs the functions needed to perform the process described below in FIGS. 2-5.

The hardware elements depicted in web page server 102 are not intended to be exhaustive, but rather are representative to highlight essential components required by the present disclosure. For instance, web page server 102 may include alternate memory storage devices such as magnetic cassettes, digital versatile disks (DVDs), Bernoulli cartridges, and the like. These and other variations are intended to be within the spirit and scope of the present disclosure.

Figure 2:
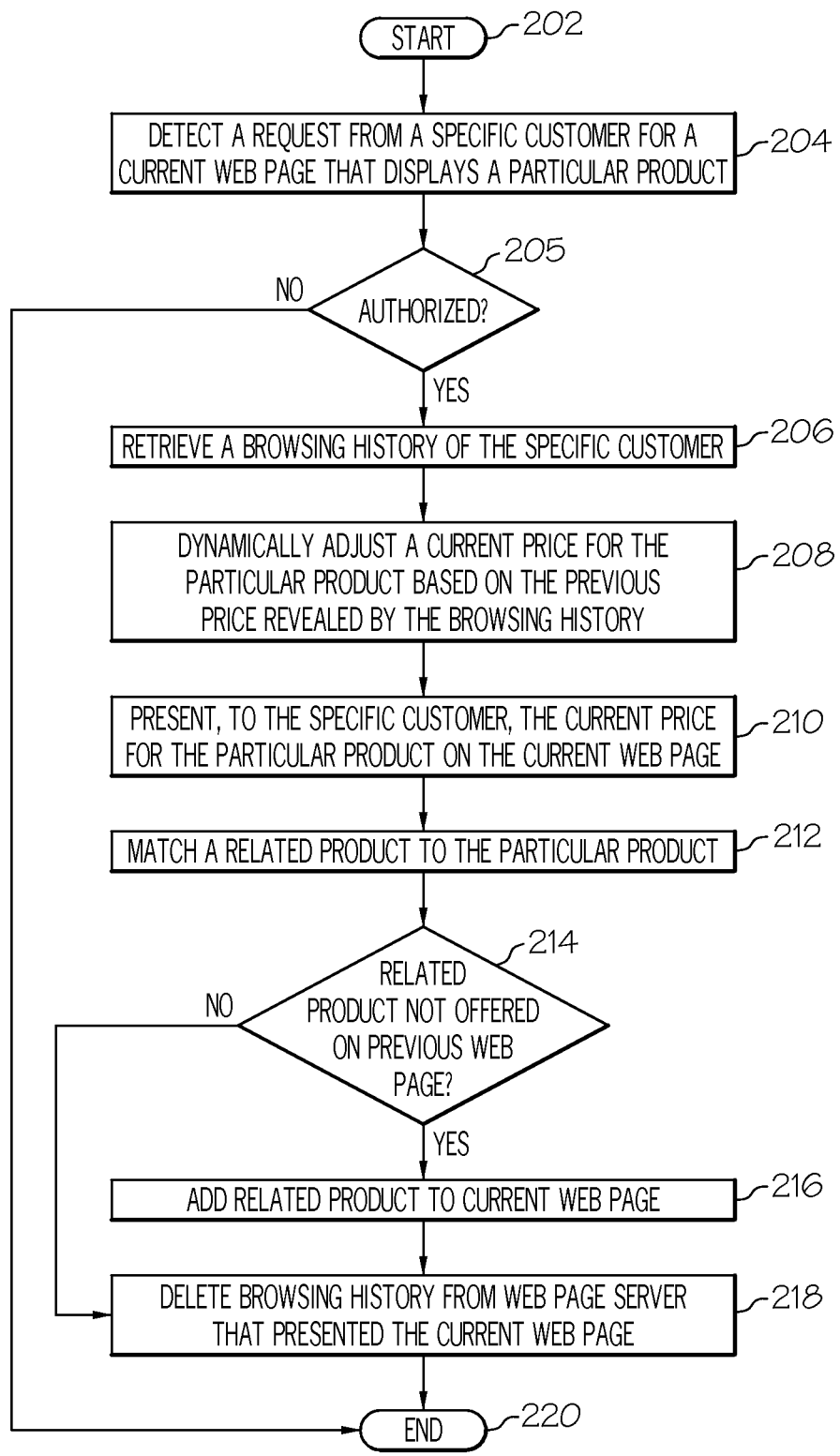
FIG. 2 is a high level flow chart of one or more exemplary steps performed by a processor to competitively market products in e-commerce.

With reference now to FIG. 2, after initiator block 202, a web page server (e.g., web page server 102 shown in FIG. 1) detects a request, from a specific customer (i.e., a user of user computer 154 shown in FIG. 1) for a current web page related to a particular product (block 204). This particular product may be a service (e.g., a web based software service from a service oriented architecture (SOA), an on-site service such as a hardware repair service, or any other software and/or human service), or the particular product may be a physical object, such as a computer, clothing, etc.

As described in block 206, if the specific customer has authorized information from a previous webpage to be retrieved by clicking a sharing user interface (query block 205), then a browsing history of the specific customer is then retrieved. This browsing history reveals a content of a previous web page that offered the particular product to the customer at a previous price, as shown in exemplary manner in FIG. 3. Note that in one embodiment the content of the previous web page is available to the web page server of the current web page only if a user has provided an authorization indicium. This authorization indicium is defined as an express authorization, granted by the user to a web server of a subsequent (current) webpage, to retrieve content from the previous web page related to a particular product. If the request for the current web page does not include this authorization indicium, then such content mining of the previous web page is not permitted.

Figure 3:
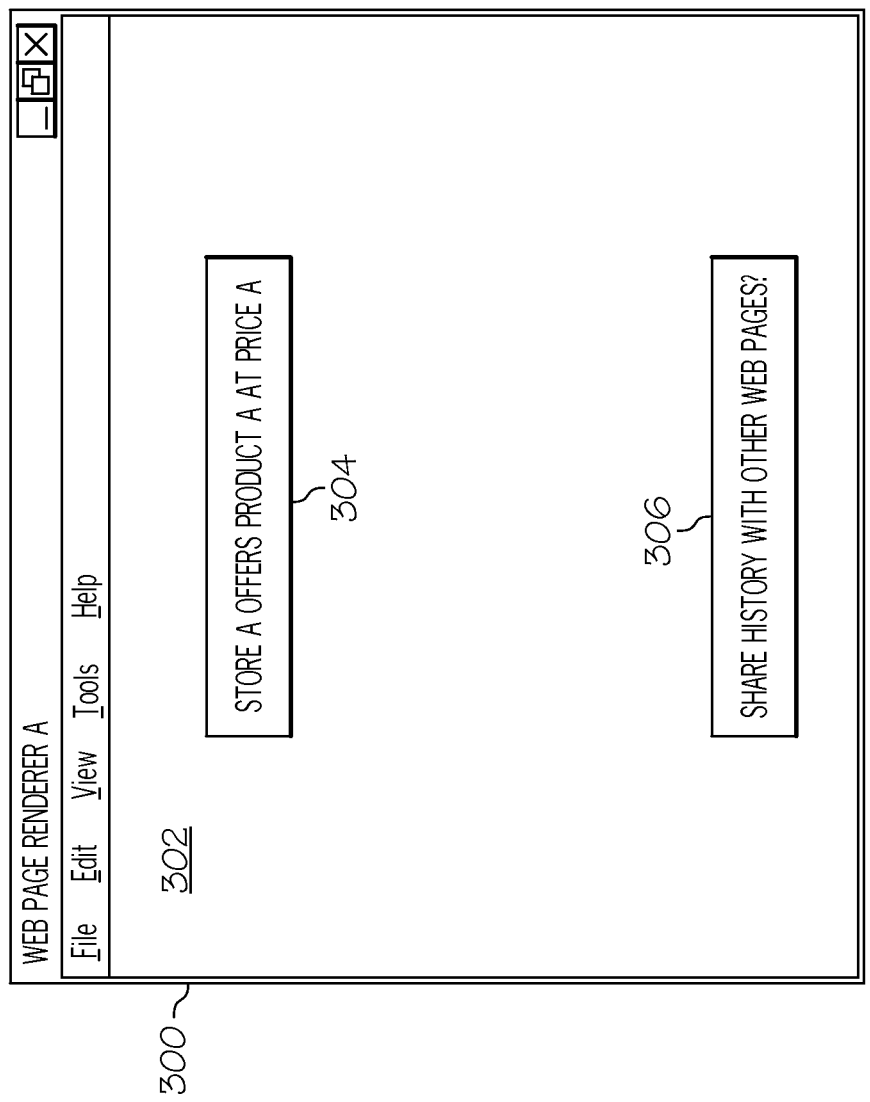
FIG. 3 illustrates an exemplary user interface for a first web page renderer.

Thus, as depicted in FIG. 3, an exemplary user interface (UI) 300 used to display a previous web page 302 is presented. In an exemplary embodiment, previous web page 302 is provided by a web page server (e.g., previous web page server 152 shown in FIG. 1) to a user computer (i.e., user computer 154 shown in FIG. 1). Previous web page 302 comprises a main display 304, which shows details of a Product A offered for sale by Store A at a certain Price A. If the user of the UI 300 so desires, then the information shown on 300 can be shared with subsequent web pages from different stores by clicking a sharing user interface 306 (or by setting a flag in the browser "Web Page Renderer A". In a manner described herein, using content from the previous web page 302 allows a second store to dynamically adjust an offered price for the same product A.

Based on the content of the previous web page, a current price for the particular product is dynamically adjusting based on the previous price revealed by the browsing history (block 208). In one embodiment, this content is directly retrieved from the previous web page(s) by examining the browsing history of the customer, and then mining the information from the web pages identified by this browsing history. The browsing history itself is provided from the customer's browser. In one embodiment, adjusting the current price results in a same or higher price than the previous price from the previous web page, but with an additional promotion. This additional promotion may be a discount coupon for products or services related to the particular product. The current price for the particular product is then presented to the specific customer on the current web page (block 210), as shown in the example depicted in FIG. 4.

Figure 4:
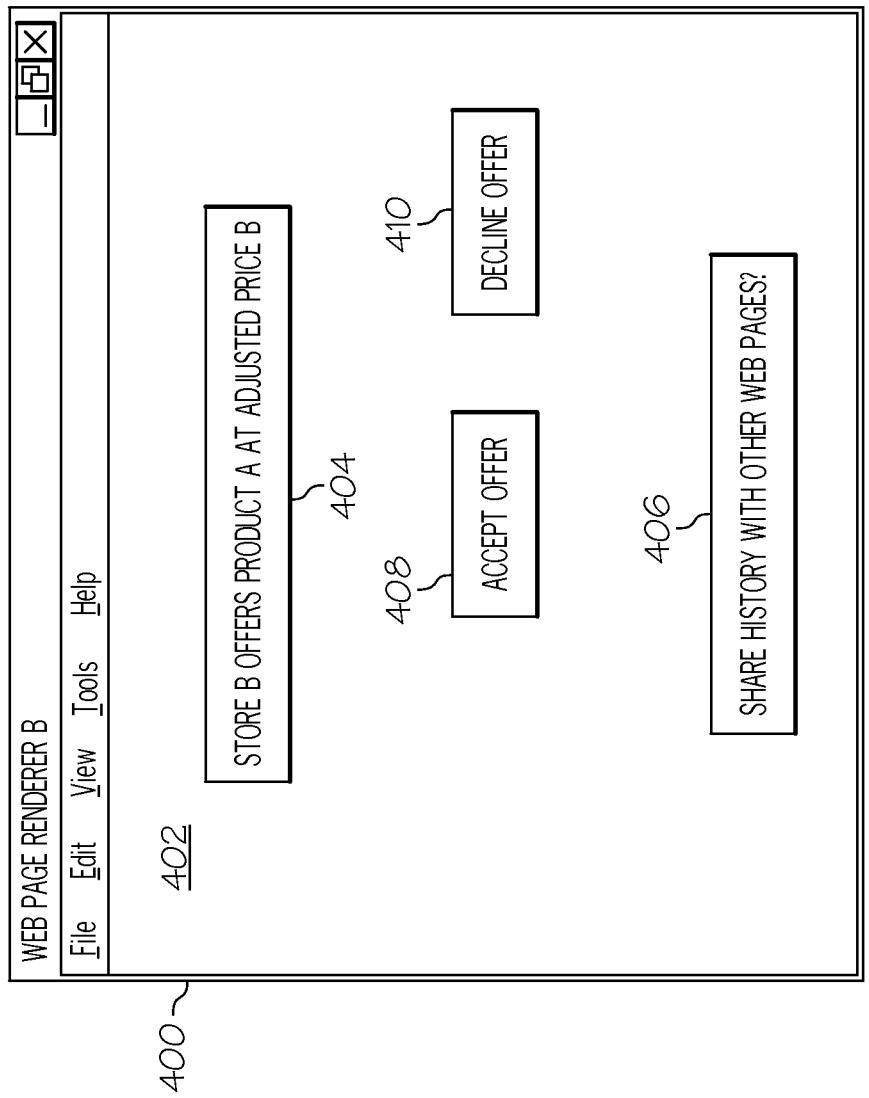
FIG. 4 illustrates an exemplary user interface for a second web page renderer.

As depicted in FIG. 4, UI 400 shows a current web page 402, which in main display 404, presents an offer from Store B to sell the Product A with an Augmentation B. This augmentation to Product A may come in the form of a lower price, free or discounted accessories, free or discounted service/ maintenance, additional user information about Product A, etc. Assume for exemplary purposes that the Augmentation B is an Adjusted Price B that is lower than the Price A from web page 302 shown in FIG. 3. In one embodiment, Store B has set a lower limit for the Adjusted Price B according to a predefined lower limit. Thus, if Store A is offering Product A at a price that is below this predefined lower limit, then Store B "drops out" of the pricing competition, and offers the product at a price at or above the predefined lower limit. However, Store B may still remain competitive by offering additional products and/or services, as described in further detail herein. If the customer desires to share the offer from Store B with other stores' web pages, then clicking the sharing user interface 406 allows this. If the customer decides to purchase Product A at the Adjusted Price B, he can do so by clicking button 408 to accept the offer. If the customer wishes to decline the offer, he can do so by clicking button 410.

In one embodiment, the adjusted current price is presented only to the specific customer for whom the presenter of the current web page has a browsing history. In another embodiment, the adjusted current price is presented and offered to any customer who subsequently requests the current web page. In another embodiment, the adjusted current price is only offered if the customer has come directly to the current web page from the previous web page.

Assume, for exemplary purposes, that a user/customer browses a web page from Store A to look for a specific camera brand and model. The web page for Store A offers this camera for $860.00. This user wants to look for a better deal from other stores, so he selects the "sharing indicator" from the web page for Store A. This "sharing indicator" can be an open authorization for any website, or specifically for named competitor websites. A browsing profile is created and the browsing information is kept in this browsing profile for that user; i.e., store name and uniform resource locator of Store A's web page, the make and model of the camera, the offered price, etc.

When this user browses the Store B web page to check the price for the same camera model, the Store B web page locates the browsing profile to gather the previous browsing information. The Store B web page can offer a new discount price based on the price information from the browsing profile for that user. Before Store B displays the new offer, it invokes an application program interface (API) to verify the Store A price. If the verification is passed, then the new offer will be displayed. Otherwise, the original price will be displayed on Store B's web page. As depicted in FIG. 4, Store B also provides a button (sharing user interface) for this user to accept the offer (or use the existing shopping check out mechanism). If this user does not accept the offer (and/or does not check out), he may then browse a web page from Store C by sharing information from the web page from Store B. Information from Store B's web page will be captured and sent to the web page for Store C. In this case, the user will have two prices from which to choose: Store A, price $860; Store B, price $800. It depends on the Store C policy whether it will offer another discount to beat the new discount price. That is, Store C will make a decision as to whether it will offer the product at its regular price, or if it will discount its regular price to meet or beat that of Store A and/or Store B.

If the user accepts the Store B new discount price (by proceeding to a check out page), then the browsing profile history for this product model is removed. In one embodiment, if the user browses back to Store A or Store C, the new discount price from Store B will never be shown to Store A or Store C. In another embodiment, the discount price from Store B with any other website, assuming that the sharing user interface on the webpage from Store B has been clicked.

Returning to FIG. 2, as described in block 212, a related product can then be matched to the particular product being presented on the web pages. This related product may be an accessory to a physical product, an additional service to augment an initial service, etc. In response to determining that this related product is not offered on the previous web page (query block 214), or is offered at a higher price, then the current web page is dynamically adjusted by adding the related product to the current web page (block 216). In one embodiment, this additional related product is offered to the specific customer at no additional charge.

As described in block 218, browsing history for the specific customer, along with any information retrieved from previous web pages, is then deleted from the web page server that presented the current web page. The browsing history can be deleted after a predetermined period of time has elapsed since the specific customer exited the previous web page; in response to the specific customer placing an order for the product from the current web page; and/or after the specific customer's browser is closed. The process ends at terminator block 220.

Figure 5:
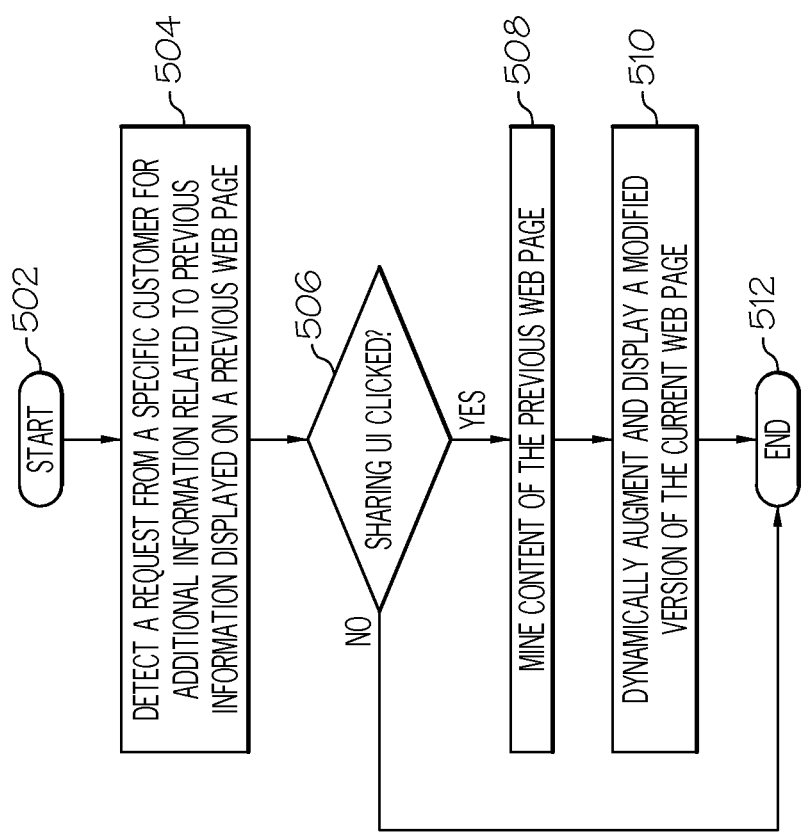
FIG. 5 is a high level flow chart of one or more exemplary steps performed by a processor to dynamically adjust a current web page.

While one embodiment of the present disclosure has been described related to competitively presenting a product such as a good or service, the present disclosure is also useful when providing product augmentation, such as additional information, additional services, etc. With reference now to FIG. 5, a high level flow chart of exemplary steps taken to provide product augmentation via an electronic communication network is presented. After initiator block 502, a web page server detects a request for a current web page related to a product (block 504). Note that throughout the present disclosure, a product is defined as a good, service, or information. A good is defined for purposes of the present disclosure as any object, such as computer equipment, clothing, books, software, downloaded music, etc. that can be embodied in a tangible form (whether being tangible in and of itself, or when embodied into a tangible unit, such as a computer storage device). A service is defined for purposes of the present disclosure as a non-tangible service, such as providing maintenance to a computer network, repairing goods, providing technical or legal advice, etc. Information is defined for purposes of the present disclosure as words, videos, etc. that provide additional instruction/information about a particular subject and/or product. In one embodiment, the request includes a sharing indicium that authorizes a sharing of content from a previous web page. This sharing indicium can result from a user clicking a sharing user interface (e.g., element 306 shown below in FIG. 3), or it can come from a setting on a browser. In either embodiment, the sharing indicium authorizes one or more subsequent web servers to access content from a previous web page.

For example, assume that previous web page server 152 has provided a previous web page to user computer 154 shown in FIG. 1. A sharing indicium (e.g., a clicking of element 306 in FIG. 3) provided by the previous web page server 152 authorizes web page server 102 to retrieve content (e.g., retrieved data) from the previous web page. Thus, if such a sharing indicium is provided (query block 506), then web page server 102 is able to dynamically augment the current web page by utilizing the content from the previous web page (block 508) to create an augmented web page (block 510). This augmented web page presents an augmentation to the product that was displayed on the previous web page. This augmentation is defined as an enhancement to the original product, such as providing additional information and/or support about the product; additional products that are useful when used with the original product; additional information about a particular subject; etc.

For example, assume that the product displayed on the previous web page is an article about a player on Sports Team A that provides information about that player's on-field statistics. However, a user may want information about business activities for that player, such as which products the player has endorsed. By going to a web site that specializes in business matters, a new web page can be generated (or a current web page can be augmented) to show information related to the product endorsements that the player has made. In one embodiment, this current web page is retrieved by automatically directing the specific user to the current web page from a homepage. For example, assume that the previous web page was about "Sports Figure A." The user might thereafter go to a homepage for "Business Network X." This homepage may contain multiple links to other web pages provided by Business Network X, including web pages related to Sports Figure A. Thus, the homepage is a gateway to multiple web pages that are managed by a same enterprise.

Returning to FIG. 5, the augmented web page is then presented to a requester of the current web page (block 510), and the process ends (terminator block 512).

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the disclosure of the present application in detail and by reference to illustrative embodiments thereof, it will be apparent that modifications and variations are possible without departing from the scope of the disclosure defined in the appended claims.

What is claimed is:

1. A computer implemented method of marketing a product in an e-commerce system, the computer implemented method comprising:
   a web page server receiving, from a specific user, a request and authorization indicium with the request for a current web page that displays a particular product, wherein the authorization indicium is an express authorization, granted by the specific user to the web page server, to retrieve a content of a previous web page related to the particular product;
   the web page server retrieving the content of the previous web page that offered the particular product at the previous price, wherein the content of the previous web page includes the previous price at which a previous web page offered the particular product, wherein the content of the previous web page is identified by a browsing history of the specific user, and wherein the content of the previous web page is available to the web page server only if the specific user has provided the authorization indicium in the request for the current web page;
   dynamically adjusting a current price for the particular product based on the previous price offered on the previous web page; and
   presenting a dynamically adjusted current price for the particular product on the current web page, wherein the dynamically adjusted current price is presented only to the specific user on a computer that retrieved both the previous web page and the current web page.

2. The computer implemented method of claim 1, wherein adjusting the current price results in a lower price than the previous price from the previous web page.

3. The computer implemented method of claim 2, further comprising:
   limiting the dynamically adjusted current price to a predefined lower limit.

4. The computer implemented method of claim 1, wherein the particular product is a service.

5. The computer implemented method of claim 1, wherein the particular product is a physical object.

6. The computer implemented method of claim 1, wherein the particular product is information related to a service.

7. The computer implemented method of claim 1, further comprising:
   presenting different prices to different users based on different browsing histories of the different users.

8. The computer implemented method of claim 1, further comprising:
   presenting an offer for free maintenance of the particular product on the current web page.

9. The computer implemented method of claim 1, further comprising:
   matching a related product to the particular product;
   determining that the related product is not offered on the previous web page; and
   dynamically adjusting the current web page by adding the related product to the current web page only upon determining that the related product is not offered on the previous web page.

10. The computer implemented method of claim 1, further comprising:
    detecting an activation of a sharing user interface on the previous web page, wherein activating the sharing user interface authorizes the web page server of the current web page to retrieve the browsing history of a specific customer; and
    presenting the browsing history to the current web page only if the sharing user interface has been activated.

11. The computer implemented method of claim 10, further comprising:
    limiting access to the browsing history to a predetermined period of time from when the specific customer exited the previous web page, wherein the access is limited for the predetermined period of time to the web page server.

12. The computer implemented method of claim 10, further comprising:
    deleting the browsing history from the web page server in response to the specific customer placing an order for the particular product from the current web page.

13. The computer implemented method of claim 1, wherein adjusting the current price results in a same or higher price than the previous price from the previous web page with an additional promotion.

14. The computer implemented method of claim 13, wherein the additional promotion is a discount coupon for products related to the particular product.

15. The computer implemented method of claim 13, wherein the additional promotion is a discount coupon for services related to the particular product.

16. A computer system comprising:
    a central processing unit; and
    a computer readable memory coupled to the central processing unit, wherein the computer readable memory comprises software that, when executed, causes the central processing unit to implement:
    receiving, from a specific user, a request and authorization indicium with the request for a current web page that displays a particular product, wherein the authorization indicium is an express authorization, granted by the specific user to the web page server, to retrieve a content of a previous web page related to the particular product;
    retrieving the content of the previous web page that offered the particular product at a previous price, wherein the content of the previous web page includes the previous price at which the previous web page offered the particular product, wherein the content of the previous web page is identified by a browsing history of the specific user, and wherein the content of the previous web page is available to the web page server only if the specific user has provided the authorization indicium in the request for the current web page;
    dynamically adjusting a current price for the particular product based on the previous price offered on the previous web page; and
    presenting a dynamically adjusted current price for the particular product on the current web page, wherein the dynamically adjusted current price is presented only to the specific user on a computer that retrieved both the previous web page and the current web page.

17. The computer system of claim 16, wherein adjusting the current price results in a lower price than the previous price from the previous web page.

18. The computer system of claim 16, wherein different prices are presented to different users based on different browsing histories of the different users.

19. A computer program product comprising a non-transitory computer readable storage medium having program code embodied therewith, the program code readable and executable by a processor to:

receive, from a specific user, a request and authorization indicium with the request for a current web page that displays a particular product, wherein the authorization indicium is an express authorization, granted by the specific user to the web page server, to retrieve a content of a previous web page related to the particular product;

retrieve the content of the previous web page that offered the particular product at a previous price, wherein the content of the previous web page includes the previous price at which the previous web page offered the particular product, wherein the content of the previous web page is identified by a browsing history of the specific user, and wherein the content of the previous web page is available to the web page server only if the specific user has provided the authorization indicium in the request for the current web page;

dynamically adjust a current price for the particular product based on the previous price offered on the previous web page; and present a dynamically adjusted current price for the particular product on the current web page, wherein the dynamically adjusted current price is presented only to the specific user on a computer that retrieved both the previous web page and the current web page.

20. The computer program product of claim 19, wherein the program code is further readable and executable by the processor to:

match a related product to the particular product;

determine that the related product is not offered on the previous web page; and dynamically adjust the current web page by adding the related product to the current web page.

\* \* \* \* \*